Dec. 27, 1955 W. PALMER 2,728,909
NON-AMBIGUOUS CYCLE MATCHING RADIO NAVIGATION SYSTEM
Filed June 3, 1948 3 Sheets-Sheet 1

INVENTOR.
WINSLOW PALMER
BY
Paul B. Hunter
ATTORNEY

Dec. 27, 1955  W. PALMER  2,728,909
NON-AMBIGUOUS CYCLE MATCHING RADIO NAVIGATION SYSTEM
Filed June 3, 1948  3 Sheets-Sheet 2
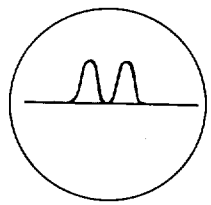
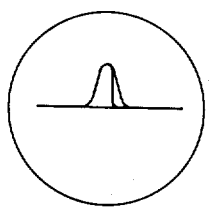
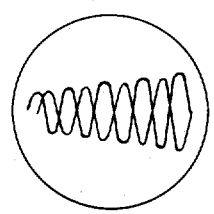
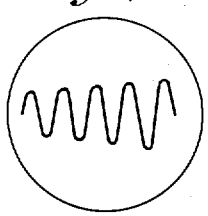
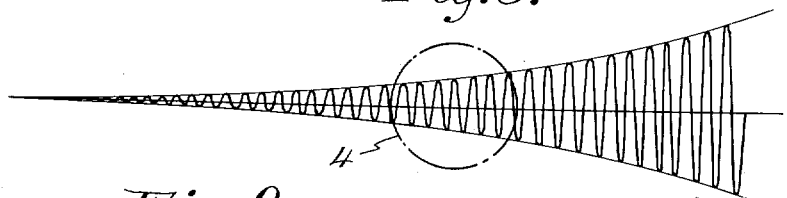
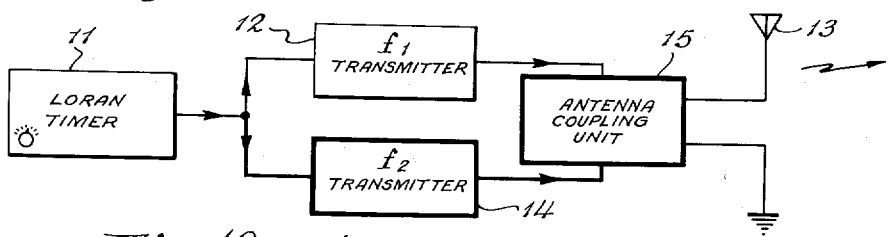
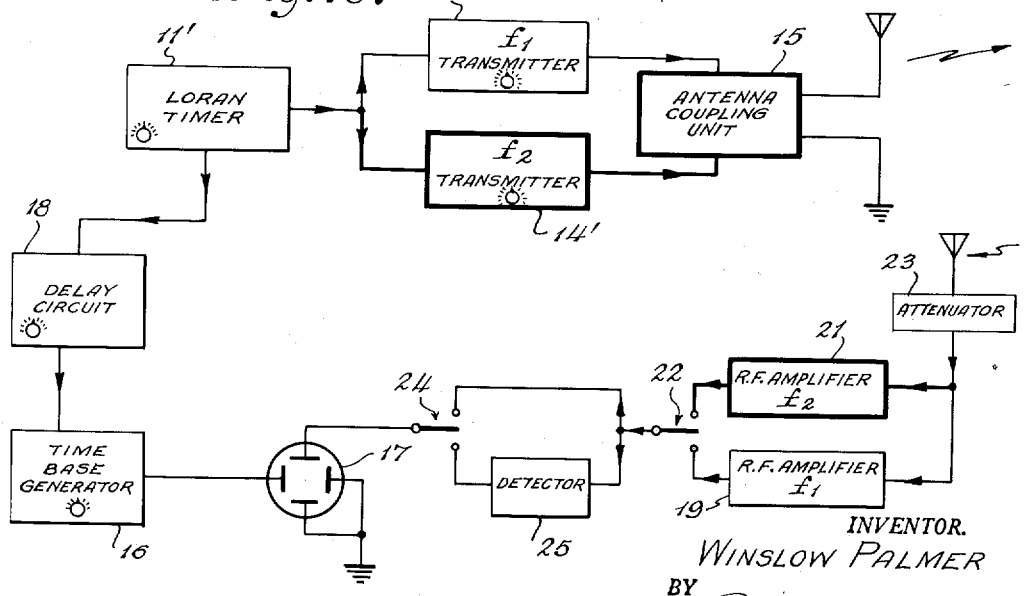
INVENTOR.
WINSLOW PALMER
BY
Paul B. Hunter
ATTORNEY Dec. 27, 1955  W. PALMER  2,728,909
NON-AMBIGUOUS CYCLE MATCHING RADIO NAVIGATION SYSTEM
Filed June 3, 1948  3 Sheets-Sheet 3

*INVENTOR.*
WINSLOW PALMER
BY
*ATTORNEY*

United States Patent Office 2,728,909
Patented Dec. 27, 1955

2,728,909

NON-AMBIGUOUS CYCLE MATCHING RADIO NAVIGATION SYSTEM

Winslow Palmer, West Hempstead, N. Y., assignor to Sperry Rand Corporation, a corporation of Delaware Application June 3, 1948, Serial No. 34,283

20 Claims. (Cl. 343—105)

This invention relates to radio navigation systems and more particularly to methods and apparatus for unambiguous cycle matching of radio frequencies in such systems. The system of the invention is called Cyclan.

In recent years there has appeared a need for a radio navigating and position determining system which will yield positional accuracies of a high degree at long ranges. The well-known low-frequency Loran system, with radio frequency cycle matching technique, appears to provide a promising approach, as a relatively long range and high accuracy are theoretically possible with this system. The cycle matching method improves the accuracy of standard Loran, which compares pulse modulations in time, by actually comparing the radio frequency cycles in phase. As there are many radio frequency cycles occurring during the pulse rise time, it will be seen that this technique greatly increases the accuracy of the time measurement. In fact, it increases it so much, that the comparing, or matching, of the pulses is not ordinarily sufficiently accurate to resolve errors of one or more full R. F. cycles in the phase comparison, or matching, of the radio frequency cycles.

The technique of radio frequency cycle matching is subject to this troublesome cyclic ambiguity which heretofore has been found difficult to resolve. The present invention solves this cycle matching problem by a system modification called Cyclan, which provides a method of reliably resolving the cyclic ambiguity.

In the Cyclan system of the invention, it is proposed that resolution of the cyclic ambiguity be obtained by setting up two parallel Loran systems on radio frequencies differing by about 10 per cent. Separate measurements are made on each frequency and the two measurements compared. If there is an error of one or more full cycles in either measurement, it will be evident by this comparison.

Accordingly, an object of the invention is to provide methods and apparatus to improve the accuracy of radio navigation systems by means of non-ambiguous cycle matching of radio frequencies.

Another object of the invention is to provide methods and apparatus for comparing radio frequency cycles in phase, including means to resolve cyclic ambiguity of said phase comparison.

Another object of the invention is to provide methods and apparatus for measuring distance with an accuracy proportional to a radio frequency wavelength, and without cyclic ambiguity.

Another object of the invention is to provide methods and apparatus to measure the difference of distance from a remote point to at least two radio frequency transmitting locations, with an accuracy proportional to the wavelength of the highest frequency used and with non-ambiguous range coverage.

Another object of the invention is to provide methods and apparatus for comparing radio frequency cycles in phase.

Another object of the invention is to provide methods and apparatus to resolve cyclic ambiguity of phase measurement.

Figs. 4, 5, 6 and 7 illustrate typical wave form patterns appearing on the receiver indicator;

Figure 11:
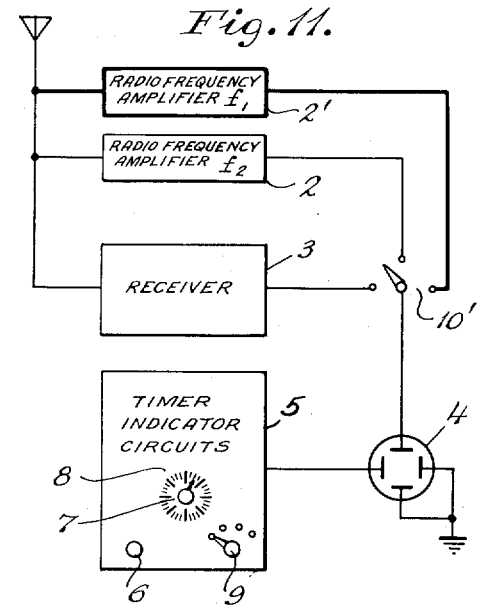
Figure 12:
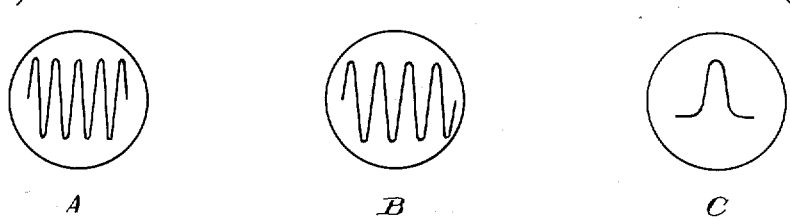
Figure 13:
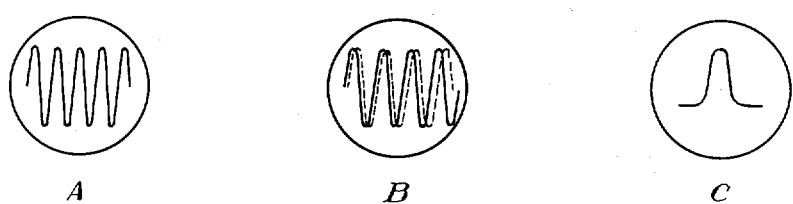
Figure 14:
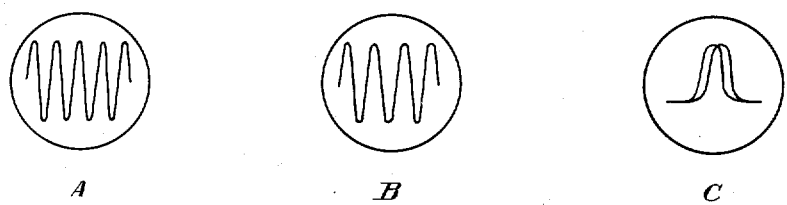

Fig. 8 contains wave forms illustrating the time relationship between the radio frequency cycles and the pulse envelopes;

Fig. 9 is a schematic block diagram of a master transmitting station;

Fig. 10 is a schematic block diagram of a slave transmitting station;

Fig. 11 is a schematic block diagram of a Loran type receiving equipment embodying the present invention;

Figs. 12, 13 and 14 contain wave forms illustrating typical indicator patterns.

Figure 1:
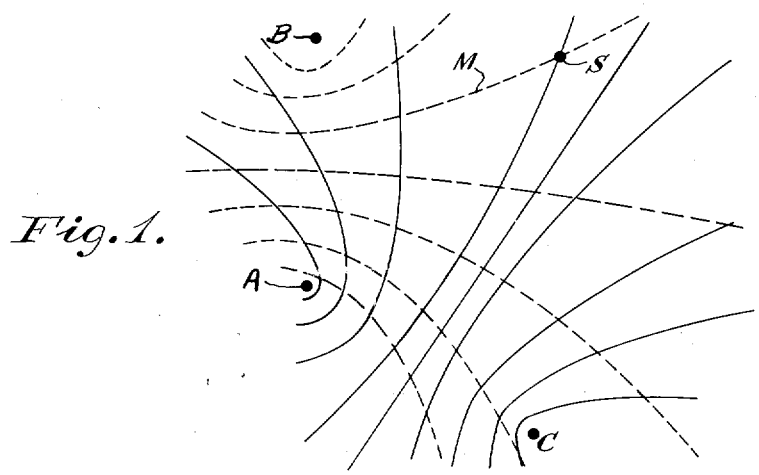
Fig. 1 is a diagram illustrating principles of hyperbolic navigation.

Figure 1 is a diagram which illustrates the principles of a Loran type navigation system. There are three transmitters located at points A, B, and C, suitably placed with respect to the region the system serves, which may transmit pulses synchronously or in a definite time relationship in pairs, as AB and BC. The common transmitter A is called the "master"; the other two, which are synchronized with separate master pulses, are known as "slaves." The receiver at point S receives the pulses at times depending upon the distance between point S and the respective transmitters and the time relationship between the master and slave pulses. The time relationship between the master and slave pulses is such that at any receiving position located within the region which the transmitting system serves, each master pulse occurs prior to the corresponding slave pulse. Measurement at a receiving station of the time between the arrival of pulses from the AB pair of transmitters defines a hyperbolic line of position, for example M, which is the locus upon which the receiving station is located. The position S of the receiver is determined by the intersection of two such lines of position obtained by measuring two such time differences from the two separate station pairs. Detailed information as to the principles of Loran is given in the November 1945 issue of Electronics magazine and in the book "Loran" edited by J. A. Pierce, A. A. McKenzie, and R. H. Woodyard published in 1948 by McGraw-Hill.

For simplicity, the receiving system will be described with reference to the signals received from transmitting stations A and B.

Figure 2:
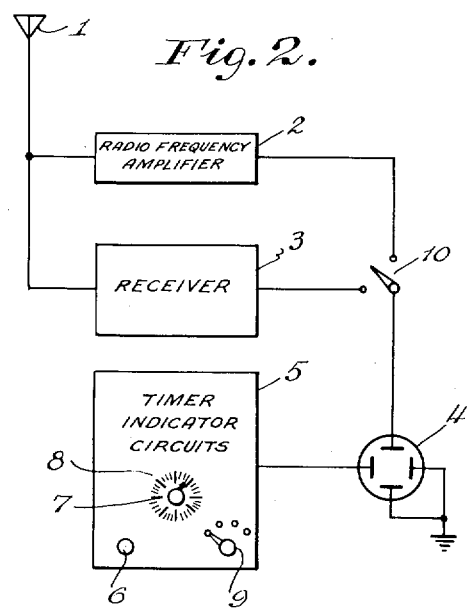
Fig. 2 is a schematic block diagram of an elementary Loran type receiving equipment.
Figure 3:
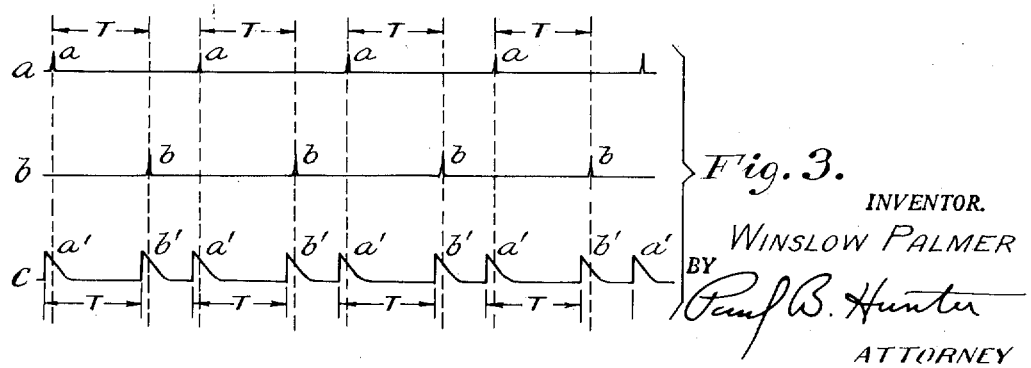
Fig. 3 shows wave forms which illustrate the method of time measurement employed.

Fig. 2 is a diagram of rudimentary Loran type receiving apparatus and Fig. 3 is a time sequence diagram, illustrating the method of measuring the time difference or "delay" between the arrival of the pulses at the receiver. Fig. 3a represents the pulses received from station A, Fig. 3b represents the pulses received from station B, and Fig. 3c represents the respective time base sweeps $a'$ and $b'$ of the timer 5 of Fig. 2.

Conventional pulse envelope matching may be obtained by detecting the pulses in conventional Loran receiver 3, which may be of the type disclosed in the December 1945 issue of Electronics, page 112, and viewing the pulses on indicator 4.

The radio frequency signals from the transmitters may be amplified in the amplifier 2 and applied directly to the deflection plates of the oscilloscope 4, by means of switch 10 in order to compare in phase, or "match," the R. F. cycles. Of course, the R. F. amplifier utilized could be that one contained in the receiver 3, the illustration of Fig. 2 being modified to better illustrate the R. F. cycle matching technique.

The timer 5 serves to generate the various sweep voltages required. Timer 5 generates a time base sweep voltage, $a'$ in Fig. 3, which is adjusted with the timer frequency control 6, to be in synchronism with the pulses received from station A.

Timer 5 also generates another time base voltage, $b'$ in Fig. 3, and sweep excursions $b'$ are caused to occur at adjustable times after the respective sweep excursions $a'$ as determined by the setting of control 7. Excursions $b'$ are caused to occur in synchronism with the pulses from station B. Then, calibrated dial 8 will give the desired time measurement, T, between signals $a$ and $b$. The duration of each of the sweep voltage excursions $a'$ and $b'$ is determined by the setting of switch 9, and the duration of the sweep excursions may be adjusted so that patterns representing the modulation envelopes of the pulses and patterns representing the radio frequency cycles of the transmitted signals may be observed on the screen of cathode ray tube 4.

Fig. 4 is a sketch of the indicator 4 pulse patterns obtained when the time bases are synchronized with the incoming pulses. Fig. 5 is similar to Fig. 4, but with the calibrated delay control 7 so adjusted that the pulse patterns are superimposed, each pulse occurring exactly the same length of time after the beginning of its respective sweep, so that the time between the pulses is exactly the same as the time between the sweeps, and is indicated by the calibrated time measurement dial 8 of the delay circuit.

The accuracy of measurement may be improved by placing switch 9 in the position which causes timer 5 to generate the fast sweep excursions required for showing the radio frequency cycles on cathode ray tube 4 and directly applying the amplified radio frequency waves, instead of the pulse envelopes of the waves, to the indicator oscilloscope 4, so that the pattern shows the individual R. F. cycles, as in Fig. 6. When the calibrated delay control 7 is adjusted to superimpose the R. F. signals, the oscilloscope 4 pattern is as in Fig. 7 with the individual cycles superimposed. Since the slope of the individual cycles, on passing through zero, is much greater than the slope of the pulse envelope, and there are many R. F. cycles occurring during the pulse rise time, the accuracy of "match" is greatly increased. This mode of operation requires that the slave transmitter be synchronized to the master transmitter in its carrier current cycles as well as its pulses.

Fig. 8 is a sketch of the leading edge of a pulse as observed with an oscilloscope in actual practice. The rate of rise of the pulse is so slow, relative to the R. F. cycles, that there is very little difference in amplitude between the successive R. F. cycles. Therefore, in superimposing or matching the pulses on the oscilloscope 4, considerable difficulty is always obtained in deciding which R. F. cycles are actually similar, i. e., occupy the same respective position in the pulses from the two stations. If the wrong R. F. cycles are chosen for superimposing, then the pulses will not be superimposed correctly, but will be mismatched by some integral number of R. F. cycle periods. The indicated time difference read on dial 8 of timer 5 would thus be in error by an amount equal to the cyclic mismatch.

In practice, for the purpose of synchronizing the slave transmitters to the master, it has been found possible to resolve this ambiguity by careful inspection of the patterns for minute differences in the cycles displayed in the pattern, but a practicable method of resolving the cyclic ambiguity for a navigator's instrument has not been found heretofore.

The present invention described herein, provides a means for resolving this cyclic ambiguity of cycle-matched low-frequency Loran and other similar systems.

This method of resolving the cyclic ambiguity of the pulse match, consists essentially of operating two systems in parallel with carrier frequencies that differ by a small amount, so that transmissions identical except for carrier frequency are provided in two channels from each transmitting station. Hence, if, in measuring the time between the pulses and the radio frequency cycles in one frequency channel, the R. F. cycle match is in error by the period of one whole cycle, the nearest reading that can be obtained by measurement of the time delay between the pulses and the radio frequency cycles in the other frequency channel will differ from the first reading. The time difference will be equal to the period of one cycle times the fractional frequency separation between channels. The difference between the closest readings in the two channels will increase by the same amount for each whole cycle in the error of match.

Actually, it is necessary to measure the time delay between the pulses in only one frequency channel since the pulses in the two channels occur simultaneously.

Hence, the addition of the second channel provides a means for determining whether the correct cycles have been selected for superposition, over a range of at least a few cycles either side of the correct match. Errors larger than a few cycles will produce a mismatch of the pulse envelopes that is discernable and can be resolved. Therefore the combination of matching the envelopes in one channel, matching the R. F. cycles in one channel, matching the R. F. cycles in the other channel, and comparing the measurements so obtained, completely resolves any ambiguity.

The invention may be illustrated conveniently by discussing its application to the present Low Frequency Loran System. This system is a pulse type hyperbolic navigation system operating with a carrier frequency of 180 kilocycles. The repetition frequency is approximately 25 pulses per second, and the pulses have a duration of approximately 300 microseconds. For simplicity, the invention will be described with reference to pulse and phase comparison between the signals which occur at a receiving station due to the signals produced by one master and one slave station. It will be apparent that pulse and phase comparison between the signals produced by the master station and both slave stations must be made in order to determine the actual position of the receiving station.

In accordance with the invention a second channel is provided operating at a frequency of 200 kilocycles to identify the cycles for cycle matching and thereby to improve accuracy and ease of operation.

Fig. 9 is a block diagram representative of a Loran master transmitter, for example station A in Fig. 1, where the timer 11 determines the pulse repetition rate, and the transmitter 12 generates a pulsed radio frequency $f_1$ which is radiated by antenna 13. In accordance with the present invention, an additional transmitter 14 is required, which generates pulses of a carrier frequency $f_2$ simultaneously or in a definite time relationship with the signals from transmitter 12. Antenna coupling network 15 connects both transmitters to the same antenna.

Transmitter timer 11 is similar in function to the receiver timer 5 and may be similar to the type disclosed in the March 1946 issue of Electronics on page 114, and transmitters 12 and 14 may be similar to the type disclosed in the same article on pages 110 and 111.

Fig. 10 illustrates equipment suitable for use in the slave transmitting station, for example station B in Fig. 1, for synchronizing the transmissions with those from the master station. In addition to the timer 11' and the transmitters 12' and 14', which are adjustable in frequency and otherwise the same as the transmitters in the master station, there is also provided an adjustable delay circuit 18, a R. F. amplifier 19 for receiving the $f_1$ signals, a time base generator 16 for generating a sweep voltage excursion in response to each signal produced by delay circuit 18 and an oscilloscope 17, for synchronizing the slave station pulses and carrier cycles therewith. Time base generator 16 is adjustable so that the proper sweep excursions required for showing the pulses and the radio frequency cycles on the screen of cathode ray tube 17 may be obtained.

The additional equipment, shown in heavy lines, needed for the R. F. cycle identification in accordance with the dual frequency system of the invention consists of an additional R. F. amplifier 21 for receiving the signals in the $f_2$ channel.

Adjustable delay circuit 18 is adjusted to delay the timing pulses produced by timer 11' a time equal to the known time of transmission from the master to the slave station plus a short predetermined time so that when the pulse envelopes of the respective master and slave stations are matched on the screen of cathode ray tube 17, each slave pulse will occur subsequent to the corresponding master pulse at any receiving location within the region which the transmitting system covers. Generator 16 is adjusted so as to produce the slow sweep excursions required for showing the pulse envelopes on cathode ray tube 17. The rotor of switch 22 is connected to radio frequency amplifier 19 and the rotor of switch 24 is connected to detector 25. Loran timer 11' is adjusted until the representations of the pulse envelopes produced by transmitters 12 and 12' are superimposed on the screen of cathode ray tube 17. Then the rotor of switch 24 is connected to radio frequency amplifier 19 and generator 16 is adjusted so as to produce the fast sweep excursions required for showing the radio frequency cycles on cathode ray tube 17. Transmitter 12' is adjusted until the representations of the radio frequency cycles produced by transmitters 12 and 12' are superimposed on the screen of cathode ray tube 17. The rotor of switch 22 is now connected to radio frequency amplifier 21 and transmitter 14' is adjusted until the radio frequency cycles produced by transmitters 14 and 14' are superimposed.

Fig. 11 illustrates the navigator's receiving equipment for measuring the time interval between the received pulses. It is similar to the receiving equipment of Fig. 2, plus the additional equipment for utilizing the dual frequency transmissions, which consists simply of the addition of a second R. F. amplifier 2'.

In operation, the rotor of switch 10' is first connected to receiver 3, switch 9 is positioned to cause timer 5 to produce slow sweep excursions, and repetition frequency control 6 of timer 5 is adjusted until the representations of the pulse envelopes produced by transmitter 12 of the master station are stationary on the screen of cathode ray tube 4. The frequency of the sweep excursions produced by timer 5 is then the same as the pulse repetition frequency of the transmitting system. Then the delay-calibrated phase control 7 of timer 5 is adjusted until the representations of the pulse envelopes produced by transmitter 12' of the slave station in question are superimposed on the master pulses. The rotor of switch 10' is now connected to radio frequency amplifier 2', switch 9 is positioned to cause timer 5 to produce fast sweep excursions, and control 6 is adjusted until the representations of the radio frequency cycles produced by transmitter 12 of the master station are stationary on the screen of cathode ray tube 4. Control 7 is adjusted until the radio frequency cycles produced by transmitter 12' of the slave station in question are superimposed on the radio frequency cycles produced by transmitter 12 of the master station. The rotor of switch 10' is now connected to radio frequency amplifier 2 and control 6 is adjusted until the patterns representing the radio frequency cycles produced by transmitters 14 and 14' are stationary on the screen of cathode ray tube 4. If these patterns are superimposed there is no cyclic ambiguity and the setting of control 7 is a precise indication of the delay time between the master and slave pulses from which the hyperbolic curve representing the locus of the receiving point is determined. If the patterns are not superimposed there is cyclic ambiguity and the position of control 7 must be corrected and the adjustment of control 6 repeated until the patterns representing the radio frequency cycles in each channel are superimposed.

Actually the patterns usually will be neither perfectly superimposed nor perfectly stationary on the screen since the frequency of the master and slave stations and the repetition rate of the sweep excursions and the transmitted pulses cannot be made precisely equal. With maximum pulse delay times of 25,000 microseconds, accuracies of the order of one part per million permit the radio frequency cycles to be superimposed within ±2 degrees.

Fig. 12 illustrates perfectly matched oscilloscope patterns observed in indicator 4, Fig. 12A showing the higher frequency R. F. cycles, Fig. 12B the lower frequency R. F. cycles and Fig. 12C the pulse modulation envelopes. Suppose the indicator time base sweep voltages are synchronized with the signals from the two stations, so that the pulse envelopes would appear in the oscilloscope pattern as in Fig. 12C. Then on switching to the R. F. pattern in the higher frequency channel, by means of switch 10' and changing the sweep speeds by means of switch 9, a pattern similar to Fig. 12A would be observed, and careful adjustment of delay control 7 will cause the patterns from the two stations to combine into a single pattern. If there is no error in choosing the correct R. F. cycles, then, upon switching to the other frequency channel by means of switch 10', the patterns will also be perfectly superimposed, as in Fig. 12B.

Fig. 13 illustrates the effect of a mismatch of one cycle. If in making the match on the higher frequency channel, the patterns were displaced by one full cycle, the time measurement would be in error by the period of one 200 kc. cycle, or 5 microseconds, although there is an apparent match as shown in Fig. 13A. However, since the period of a cycle in the 180 kc. channel would be 5.55 microseconds, this pattern would not be matched, but upon switching the indicator to this channel, a pattern mismatched by 0.55 microsecond or approximately a tenth of a cycle would appear, as in Fig. 13B, indicating that the apparent match of Fig. 13A was in error.

Fig. 14 illustrates a mismatch of approximately ten full R. F. cycles. The patterns representing the master and slave pulses in the lower frequency channel will be displaced from each other by a tenth of a cycle, for each whole cycle of error in the match of the higher frequency channel. Hence, if the error of match were ten cycles of the higher frequency, the separation of the lower frequency patterns would be one whole cycle, and the patterns would appear to be matched, as in Figs. 14A and 14B. However, an error of ten whole cycles at 200 kilocycles would be 50 microseconds, which would produce a readily apparent displacement of the pulse envelope patterns, as in Fig. 14C.

Hence, only the correct cycle match will produce superimposed patterns of both R. F. cycle patterns, and the envelope pattern.

Sky wave interference will follow the ground wave signals by at least 50 microseconds, so it is possible to minimize it by matching R. F. cycles occurring during the first 50 microseconds of the pulse rise time.

Therefore, it is seen that the invention resides basically in the resolution of cyclic ambiguity of phase measurement by parallel system operation. Dual frequency operation has been utilized to illustrate the invention in a simpler manner. It is obvious that the parallel systems may be differentiated by other ways, such as, by different pulse repetition rates, or other different modulations without departing from the scope of the invention.

Also, synchronously pulsed systems have been utilized to illustrate the invention as simply as possible. More elaborate systems may be evolved such as, systems having alternate or staggered pulsing, or pulsing with coded delays, without departing from the basic invention herein disclosed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a hyperbolic navigation system, receiving means adapted to separately receive at least two different frequency master modulated signals and at least two different frequency slave modulated signals transmitted in synchronism with said master signals, including means to compare in time phase the radio frequency cycles of the first frequency master and slave signals, means to compare in time phase the radio frequency cycles of the other equal frequency master and slave signals, and means to compare the arrival time of the master and slave modulation signals.

2. Radio navigation apparatus comprising means to compare two first frequency signals which are transmitted from separate locations with a definite phase relationship, said signals being modulated with a definite time relationship, means to resolve cyclic ambiguity of said comparison including means to compare second frequency signals which are similarly modulated and transmitted from said separate locations with a definite phase relationship, and means to resolve cyclic ambiguity of said second comparison including means to compare the arrival times of modulations which are transmitted from said separate locations.

3. Means to resolve cyclic ambiguity in cycle matching navigation systems comprising, a first modulated transmitting system including a master and two synchronized slave stations, a second modulated transmitting system located identically with the first system but having distinguishable transmission characteristics, and receiving means responsive to said stations including means to distinguish said separate systems, means to measure the difference in the arrival times of said modulated signals, means to make time phase measurements between the radio frequency cycles in each system, and means to compare the separate system measurements.

4. Means for improving the accuracy of pulse modulated hyperbolic navigation systems comprising means for operating at least two of said systems in parallel at the same locations but at different frequencies, means for synchronizing in phase the equal radio frequency transmissions from the separate transmitter locations, means for receiving and comparing the arrival times of said pulse modulations and comparing in phase the radio frequency cycles of the separate pulse modulated transmissions of one of said frequencies, and means for receiving and comparing in phase the radio frequency cycles of the separate pulse modulated transmissions of a second of said related frequencies to thereby resolve cyclic ambiguity of said first phase measurement.

5. In a radio navigation system, means for measuring the difference of distances from a receiving location to at least two transmitting locations comprising means for transmitting at least two modulated radio frequency signals from one of said transmitting stations; means for transmitting synchronously radio frequencies equal to said first radio frequencies from at least one other of said transmitting stations; means for comparing the arrival times of said modulated signals at said receiving location, means for matching at said receiving location corresponding first radio frequency cycles received from said separate transmitting locations, to thereby measure said difference of distance; and means for matching corresponding second radio frequency cycles received from said separate transmitting locations to thereby resolve cyclic ambiguity of said first measurement.

6. In a pulse modulated radio navigation system, means for measuring the difference of distances from a receiving location to at least two transmitting locations comprising means for transmitting pulse modulated first and second frequency signals from each of said transmitting locations, means for transmitting said pulse modulated first and second frequency signals from another location in synchronism respectively with said first and second signals from said first location, means for matching separately received radio frequency cycles of said first frequency at the receiving location to thereby obtain a fine measurement of said difference of distances, means for matching separately received radio frequency cycles of said second frequency to thereby resolve cyclic ambiguity in said fine measurement, and means for matching said separately received pulse modulation envelopes to thereby resolve cyclic ambiguity of said second phase comparison.

7. In a radio navigation system, means for measuring the difference of distances from a receiving location to at least two transmitting locations, comprising means for synchronously transmitting at least two frequencies from each of said transmitting locations, means for synchronously modulating said transmitted frequencies, matching separately received radio frequency cycles of one frequency at the receiving location, to thereby obtain a measurement of said distance difference; means for matching separately received radio frequency cycles of a second frequency, to thereby resolve cyclic ambiguity in said first measurement; and means for matching separately received modulations to thereby resolve cyclic ambiguity of said second measurement.

8. In a hyperbolic navigation system, a master transmitting station adapted to transmit at least two modulated signals separated in frequency, and at least one slave transmitting station adapted to transmit at least two corresponding modulated signals separated in frequency and synchronized in modulation time and radio frequency phase with said master transmitting station signals, thereby affording means to resolve cyclic ambiguity of a single frequency phase comparison.

9. In a hyperbolic navigation system, a master transmitting station adapted to transmit at least two modulated signals separated in frequency; at least one slave transmitting station synchronized by said master transmitting station and adapted to transmit at least two modulated signals equal to said master signals in frequency and having definite modulation time and radio frequency phase relationships therewith; and receiving means adapted to receive said master and slave signals, including means to compare the arrival times of said modulated signals, means to compare in phase first equal frequency master and slave signals, and means to compare in phase other equal frequency master and slave signals, to thereby resolve cyclic ambiguity of said first frequency phase comparison.

10. Means for improving the accuracy of modulated hyperbolic navigation systems comprising means for operating in parallel at least two synchronized systems at the same locations, means for synchronizing the modulated signals and the radio frequency cycles produced by each system, means for receiving and comparing in phase the separate transmissions of one of said systems, means for receiving and comparing in phase the separate transmissions of a second of said systems, to thereby resolve cyclic ambiguity of said first phase measurement, and means for receiving and the comparing the arrival times of the modulations of separate transmissions of one of said systems to thereby resolve cyclic ambiguity in said second phase comparison measurement.

11. In a radio navigation system employing plural transmitting stations each of which transmits modulated signals simultaneously on first and second frequencies in predetermined modulation time and radio frequency phase relation with the signals transmitted by the other stations and in which said first and second frequencies are the same for the various stations, a receiving station for comparing the arrival times of the signals transmitted from predetermined pairs of said stations comprising means for measuring the phase relations between equal frequency signals received from said pair of stations and means for comparing the phase measurements to resolve cyclic ambiguity.

12. The apparatus of claim 11, wherein said first and second frequencies differ in frequency by 10 percent.

13. The apparatus of claim 11, wherein said receiving station comprises a detector, a first radio frequency amplifier responsive to signals of said first frequency, a second radio frequency amplifier responsive to signals of said second frequency, means responsive to the output of said detector for measuring the time delay between the modulated signals received from said predetermined pairs of stations, and means responsive to the outputs of said first and second radio frequency amplifiers for determining the time delay required to cause the radio frequency cycles of the signals received on each of said frequencies from said predetermined pairs of stations to occur substantially in phase coincidence.

14. A radio navigation system comprising means for producing modulated radio frequency signals from at least two separate locations, simultaneous signals on two frequencies being emitted from each location, said two frequencies being the same for each location and the signals of the same frequency produced at the separate locations having predetermined modulation time and radio frequency phase relations, and receiving means for comparing the arrival times of said modulated signals and for measuring the time-phase relationship between the radio frequency cycles of the signals of equal frequency.

15. A radio navigation system comprising means for producing modulated radio frequency signals from at least two separate locations, simultaneous signals on two frequencies being emitted from each location, said two frequencies being the same for each location and the signals of the same frequency produced at the separate locations having predetermined modulation time and radio frequency phase relations, and receiving means for measuring the time delay between the arrival times of said modulated signals and for measuring the phase relationship between the corresponding radio frequency cycles which comprise the signals of equal frequency.

16. A radio navigation system comprising a master and two slave transmitting stations at separate locations, each transmitting station being adapted to produce modulated radio frequency signals simultaneously on two frequencies, said two frequencies being the same for the various stations and the signals produced by each slave station having predetermined modulation times and radio frequency phase relations to the signals produced by said master station, and a receiving station for comparing the arrival times of said modulated signals and for measuring the time-phase relationship between the radio frequency cycles of the signals of equal frequency.

17. A radio navigation system comprising means for producing pulse modulated radio frequency signals from at least two separate locations, simultaneous signals on two frequencies being emitted from each location, said two frequencies being the same for each location and the signals of the same frequency produced at the separate locations having predetermined modulation time and radio frequency phase relations, and receiving means including a detector, a first radio frequency amplifier, responsive to one of said two frequencies, a second radio frequency amplifier responsive to the other of said two frequencies, a cathode ray tube, means for selectively connecting the vertical deflection plates of said cathode ray tube to the output of said detector or one of said radio frequency amplifiers, means for applying sweep voltage excursions of adjustable duration to the horizontal deflection plates of said cathode ray tube, a sweep excursion being applied coincident with each pulse signal received, and means for determining the time relationships between said sweep excursions.

18. In a radio navigation system, plural transmitting stations each of which transmits modulated signals simultaneously on two frequencies in predetermined modulation time and radio frequency phase relation with the signals transmitted by the other stations, said two frequencies being the same for the various stations.

19. In a radio navigation system, plural transmitting stations each of which transmits pulse modulated signals simultaneously on first and second frequencies in predetermined modulation time and radio frequency phase relation with the signals transmitted by the other stations, said first and second frequencies being the same as the respective signals from the other stations.

20. The combination of claim 19 wherein said first and second frequencies differ in frequency by 10 percent.

References Cited in the file of this patent

UNITED STATES PATENTS

| Number | Name | Date |
|---|---|---|
| 1,942,262 | Shanklin | Jan. 2, 1934 |
| 1,998,834 | Englund | Apr. 23, 1935 |
| 2,144,203 | Shanklin | Jan. 17, 1939 |
| 2,408,773 | Goodall | Oct. 8, 1946 |
| 2,436,376 | Bown | Feb. 24, 1948 |
| 2,440,755 | O'Brien | May 4, 1948 |
| 2,462,764 | O'Brien | Feb. 22, 1949 |
| 2,483,558 | O'Brien | Oct. 4, 1949 |
| 2,513,315 | Hawkins (1) | July 4, 1950 |
| 2,513,321 | Hawkins (2) | July 4, 1950 |
| 2,531,908 | Grenfell | Nov. 28, 1950 |

FOREIGN PATENTS

| Number | Country | Date |
|---|---|---|
| 120,663 | Sweden | Jan. 20, 1948 |
| 630,867 | Great Britain | Oct. 24, 1949 |